(12) United States Patent
Laughlin et al.

(10) Patent No.: US 6,318,593 B1
(45) Date of Patent: Nov. 20, 2001

(54) CONTAINER WITH METERED DISPENSING CONSTRUCTION

(75) Inventors: Thomas Laughlin, Huntington Beach, CA (US); Steven Block, Greenville, WI (US); William Patterson, Bethel, OH (US)

(73) Assignee: Graphic Packaging Corporation, Golden, CO (US)

( * ) Notice: Subject to any disclaimer, the term of this patent is extended or adjusted under 35 U.S.C. 154(b) by 0 days.

(21) Appl. No.: 09/492,252

(22) Filed: Jan. 27, 2000

Related U.S. Application Data
(60) Provisional application No. 60/117,588, filed on Jan. 27, 1999.

(51) Int. Cl.[7] .................................................. G01F 11/26
(52) U.S. Cl. ................................................ 222/1; 222/456
(58) Field of Search ................................. 222/454, 455, 222/456, 457, 1

(56) References Cited

U.S. PATENT DOCUMENTS

| | | |
|---|---|---|
| 2,069,281 | 2/1937 | Sebreny . |
| 2,335,363 * | 11/1943 | Shelton ................................ 222/456 |
| 2,610,770 | 9/1952 | Penfield . |
| 2,898,004 | 8/1959 | Klausmann et al. . |
| 2,943,769 | 7/1960 | Klausmann . |
| 2,980,540 | 4/1961 | Turpin . |
| 2,983,424 | 5/1961 | Glass . |
| 3,057,524 | 10/1962 | Shanks . |
| 3,114,474 | 12/1963 | Davis . |
| 3,166,229 | 1/1965 | Sherman et al. . |
| 3,187,961 | 6/1965 | Moore . |
| 3,235,144 | 2/1966 | Pitkin et al. . |
| 3,298,576 * | 1/1967 | Sellors ................................ 222/456 |
| 3,302,847 | 2/1967 | Hennessey . |
| 3,347,446 | 10/1967 | Guyer et al. . |
| 3,441,002 | 4/1969 | Lawalin et al. . |
| 3,563,449 | 2/1971 | Forbes, Jr. . |
| 3,804,321 | 4/1974 | Forbes, Jr. . |
| 3,831,833 | 8/1974 | Dressler et al. . |
| 3,921,862 | 11/1975 | Holmstrom . |
| 4,111,351 | 9/1978 | Mackiernan . |
| 4,113,086 | 9/1978 | Forbes, Jr. . |
| 4,261,483 | 4/1981 | Dutcher . |
| 4,342,417 | 8/1982 | Forbes, Jr. . |
| 5,056,708 | 10/1991 | Boyle et al. . |
| 5,465,834 | 11/1995 | Sieber et al. . |

FOREIGN PATENT DOCUMENTS

| | | |
|---|---|---|
| 681293 | 2/1993 | (CH) . |
| 100017 | 12/1961 | (NL) . |

* cited by examiner

*Primary Examiner*—Joseph A. Kaufman
(74) *Attorney, Agent, or Firm*—Dorsey & Whitney LLP

(57) ABSTRACT

A simple and inexpensive container is constructed to dispense the contents of the container in predetermined, controlled amounts. Preferably, the container includes a reservoir that is adapted to hold a predetermined amount of material. The reservoir includes an opening through which the predetermined amount of material enters the reservoir. A flow tube is connected with the reservoir and communicates with a pour spout through which the material being dispensed exits the container. When the container is positioned upright, the predetermined amount of material fills the reservoir. When the container is turned upside down to dispense material from the container, only the material in the reservoir is able to flow into the flow tube and be dispensed from the container through the pour spout. The container is preferably formed from a two-dimensional blank, which is folded and secured to form the container. A method of forming the two-dimensional blank into the container is also disclosed.

42 Claims, 6 Drawing Sheets

CONTAINER WITH METERED DISPENSING CONSTRUCTION

CROSS-REFERENCE TO RELATED APPLICATION

This application is related and claims priority to U.S. provisional application Serial No. 60/117,588, filed Jan. 27, 1999, and entitled "Container with Metered Dispensing Construction" ('588 application). The '588 application is hereby incorporated by reference as though fully set forth herein.

BACKGROUND OF THE INVENTION a. Field of the Invention

The present invention generally relates to containers. More particularly, the present invention pertains to containers having a construction that meters the amount of product dispensed from the container.

b. Background Art

Containers, such as cardboard boxes, can be formed from a single sheet (i.e., a two-dimensional) blank of material which is folded and glued to form a three-dimensional container. It is known to provide such containers with internal compartments. These compartments are often provided to contain diverse materials or products, or to arrange the materials contained within the container in a certain manner.

It has been found desirable in certain applications to be able to dispense the contents in the container in controlled, predetermined amounts. A number of known containers that are constructed to dispense metered amounts of material rely upon a hinged pour spout construction that acts both as a reservoir for the predetermined amount of material and as a dispensing opening on the container. These hinged pour spouts are relatively complicated in construction and are oftentimes provided as a member that is separate from the blank forming the remainder of the container. This construction thus increases the cost and complexity associated with the container.

Therefore, it would be beneficial to provide a container that is able to dispense a controlled, predetermined amount of material, while at the same time being relatively simple and inexpensive in construction.

BRIEF SUMMARY OF THE INVENTION

The present invention provides a three-dimensional container in which is disposed a reservoir that is designed to hold a predetermined amount of material. A flow tube is connected with the reservoir and communicates with a pour spout on the container. When the container is positioned upright, a predetermined amount of material fills the reservoir. When the container is turned upside down to dispense material from the container, only the material in the reservoir is able to flow into the flow tube and be dispensed from the container. Thus, the container is able to dispense a metered amount of material corresponding to the amount of material in the reservoir.

In one embodiment, the container is in the form of a box. The box is formed from a two-dimensional blank, which is folded and secured to form a three-dimensional container. Preferably, the reservoir, flow tube, and pour spout opening are all integrally formed within the blank.

In another form, the invention comprises a three-dimensional container formed from a two-dimensional blank and having an interior for pourably retaining a granular material. The container comprises a plurality of panels enclosing a volume defining the interior of the container; a pour spout providing a passage though at least one of the panels; a reservoir mounted within the interior of the container and adapted to hold a predetermined amount of the granular material; and a flow tube connecting the reservoir with the pour spout. The reservoir and the flow tube may form an integral unit. That integral unit may be part of the two-dimensional blank, or the integral unit may be separate from the two-dimensional blank and mounted in the interior of the container. An opening adapted to receive the granular material may be present in the top portion of the reservoir. The pour spout may include a flap having a tab portion. A preferred material from which to make the two-dimensional blank is cardboard, most preferably being on the order of 0.01–0.03 inches thick.

In yet another form, the invention comprises a blank constructed from a foldable material and adapted to be formed into a three-dimensional container for pourably retaining a granular material. The blank comprises a first plurality of panels, including contiguous side and main panels joined by a first plurality of fold lines; at least one top flap contiguous with at least one of the main panels; at least two top end flaps contiguous with at least one of the side panels; at least one bottom flap contiguous with at least one of the main panels; at least two bottom end flaps contiguous with at least one of the side panels; and a second plurality of panels comprising reservoir-and-flow-tube-forming panels joined by a second plurality of fold lines, wherein at least one of the second plurality of panels is contiguous with at least one of the first plurality of panels along a joining fold line. The first plurality of panels may comprise two main panels and three side panels, wherein the side panels are narrower than the main panels, and wherein each of the main panels is contiguous with two of the side panels, and each of the side panels is contiguous with at least one of the main panels.

In still another form, the present invention comprises a method of dispensing a predetermined amount of granular material from a three-dimensional container having an interior adapted to pourably retain the granular material. The method comprising the steps of enclosing a volume defining the interior of the container using a plurality of panels; establishing a pour spout that provides a passage though at least one of the panels; mounting a reservoir within the interior of the container, wherein the reservoir is adapted to hold the predetermined amount of granular material; connecting a flow tube between the reservoir and the pour spout; positioning the container in an upright configuration; placing enough of the granular material into the interior of the container to at least fill the reservoir with the predetermined amount of granular material; and turning the container upside down to dispense the predetermined amount of granular material from the reservoir, through the flow tube, and out of the pour spout.

In another form, the invention comprises a method of forming a two-dimensional blank (constructed from a foldable material) into a three-dimensional container having an interior adapted to pourably retain a predetermined amount of granular material, a top end, and a bottom end. In this form of the invention, the blank includes a first plurality of panels joined by a first plurality of fold lines. The first plurality of panels comprising first and second main panels, and first, second, and third side panels, wherein the side panels are narrower than the main panels, and wherein the first side panel is contiguous with only the first main panel, wherein the second side panel is contiguous with both the first and second main panels, and wherein the third side panel is contiguous with the second main panel. The blank also includes at least one top flap contiguous with at least one of the main panels; at least two top end flaps contiguous with at least one of the side panels; at least one bottom flap contiguous with at least one of the main panels; at least two bottom end flaps contiguous with at least one of the side panels; and a second plurality of panels joined by a second plurality of fold lines. The second plurality of panels comprising an L-shaped panel, a flow-tube panel, a short panel, and an outer panel. The second plurality of fold lines comprises a first fold line joining the outer panel with the short panel; a second fold line joining the short panel with the L-shaped panel; a third fold line joining the outer panel with the flow-tube panel; and a fourth fold line joining the flow-tube panel with the L-shaped panel. A fifth fold, which is between the third side panel and the L-shaped panel, joins the second plurality of panels with the first plurality of panels. The first plurality of fold lines comprises a sixth fold line joining the third side panel with the second main panel; a seventh fold line joining the second main panel with the second side panel; an eighth fold line joining the second side panel with the first main panel; and a ninth fold line joining the first main panel with the first side panel. In this form of the invention, the method comprises the steps of folding substantially 90° in a first direction along the first and third fold lines while simultaneously folding in a second, opposite direction along the second and fourth fold lines to position the short panel and the flow-tube panel perpendicularly between the outer panel and the L-shaped panel while keeping the outer panel substantially parallel to the L-shaped panel. Then, one folds substantially 90° in the second direction along the fifth fold line, and then substantially 90° in the second direction along the sixth fold line to bring the outer panel into contact with the second main panel. The method continues by attaching the outer panel to the second main panel; folding substantially 90° in the second direction along the seventh fold line; folding substantially 90° in the second direction along the eighth fold line to bring the L-shaped panel into contact with the first main panel; attaching the L-shaped panel to the first main panel; folding substantially 90° along the ninth fold line to bring the first side panel contact with the third side panel; attaching the first side panel to the third side panel; closing the top end; and closing the bottom end.

Other aspects, features, and details of the present invention will be apparent from reading the following description and claims, and from reviewing the accompanying drawings.

BRIEF DESCRIPTION OF THE DRAWING FIGURES

DETAILED DESCRIPTION OF THE INVENTION

Figure 1:
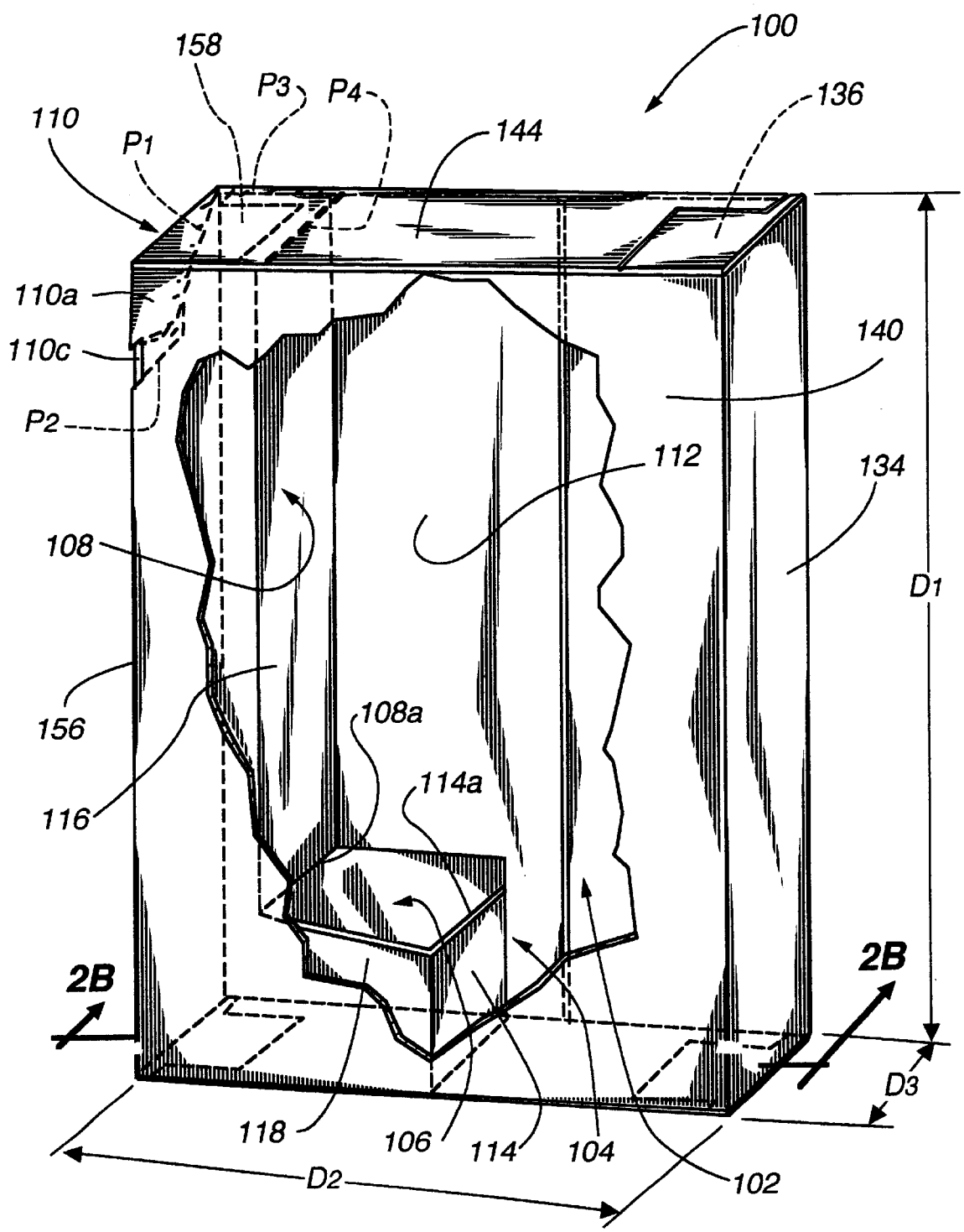
FIG. 1 is a cut-away isometric view of a container according to one embodiment of the present invention.
Figure 2:
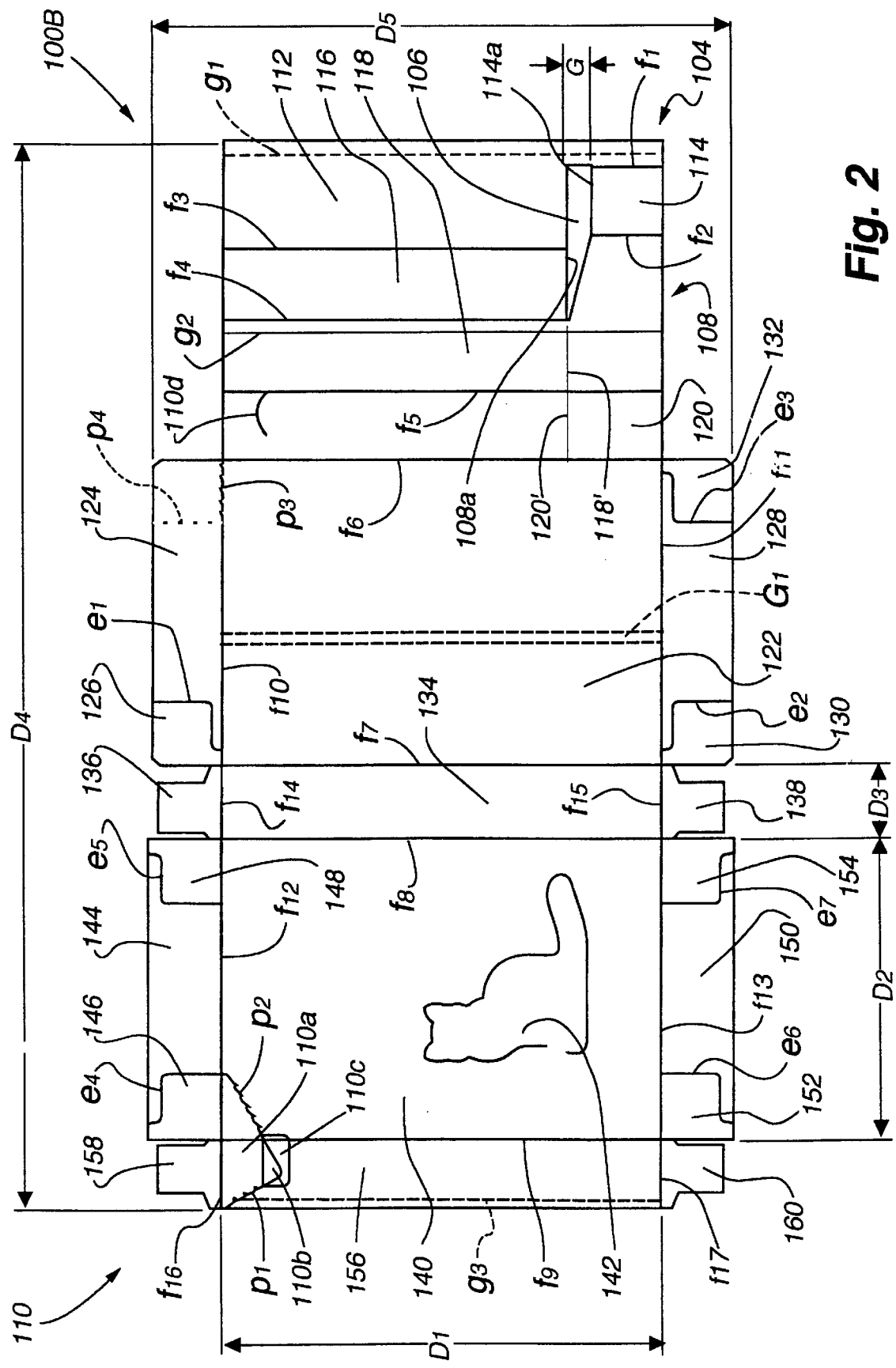
FIG. 2 is a plan view of a blank used to form the container of FIG. 1.

A first embodiment of a container constructed according to the principles of the present invention is shown in FIGS. 1 and 2. The container 100 shown in FIG. 1 is in the form of a three-dimensional folded box having a height or longitudinal dimension $D_1$, a width or lateral dimension $D_2$, and a depth or thickness dimension $D_3$. It should be understood that the container 100 of the present invention may take forms other than that illustrated in FIG. 1, and is not limited by the shapes or sizes illustrated in the drawing figures. A container constructed according to the present invention may be constructed of any suitable material. One such material is cardboard. By way of illustration only, the cardboard may be on the order of 0.01–0.03 inches thick.

The container 100 defines an interior compartment 102 for holding material to be dispensed. The container 100 can be used to package a variety of different products. By way of example, the construction of the container 100 of the present invention has been shown to be effective in housing and dispensing a solid, granular, flowable material such as pet food.

One particularly advantageous aspect of the present invention involves the ability of the container 100 to dispense a predetermined, controlled amount of material. This metered material dispensing is achieved by a combination of features. A reservoir 104 is provided at the bottom of the interior compartment 102. The top portion of the reservoir 104 includes an opening 106 through which material in the interior 102 of the container 100 can flow into the reservoir 104. The size and shape of the reservoir 104 and the opening 106 can be varied depending upon the size, shape, and other properties of the material being dispensed, as well as the desired amount of material or product that is to be dispensed each time the container is inverted for pouring.

A flow tube 108 communicates with the reservoir 104. In a preferred construction, the flow tube 108 and the reservoir 104 form an integral unit. That is, the flow tube 108 and the reservoir 104 form a part of the blank that is used to form the overall container 100. Alternately, the flow tube and reservoir can be a separate unit from the blank. This unit can then be inserted into a formed container. The flow tube 108 transports the material housed in the reservoir 104 to a pour spout 110. As with the reservoir 104, the size, shape, and configuration of the flow tube 108 may vary depending upon the size, shape, and other properties of the material being dispensed. Another important aspect in the proper design of the reservoir 104 and the flow tube 108 is the vertical spacing or gap G (FIG. 2) provided between a lip 114a of the reservoir opening 106 and a bottom lip 108a of flow tube 108. The size of this gap G, and the relative shapes of the lips 114a and 108a can be varied depending upon the size, shape, and other properties of the material being dispensed, and depending upon other factors such as the width of the reservoir opening 106.

By the above construction, only that amount of material contained within reservoir 104 is able to flow through the flow tube 108 and to the pour spout 110 when the container 100 is inverted or turned upside down from the upright position shown in FIG. 1 to dispense material contained within the container. After the contents of the reservoir 104 have exited the container 100 through the flow tube 108 and the pour spout 110, the container 100 is returned to the position illustrated in FIG. 1. When the container 100 is once again righted, the material contained within the interior compartment 102 settles back toward the bottom of the container 100 and enters the opening 106 of the reservoir, thereby refilling the reservoir 104.

The above-described reservoir 104 and flow tube 108 construction may also serve as a temporary storage area for secondary or promotional items (not shown) contained separately from the main contents of the interior compartment 102. These secondary or promotional items may be removed by the consumer prior to dispensing the main contents of the container 100.

The pour spout 110 is constructed to facilitate the flow of material out of the flow tube 108. Once again, the particular construction of the pour spout 110 may vary depending upon the size, shape, and other properties of the material being dispensed. One preferred pour spout construction is illustrated in FIGS. 1 and 2. FIG. 2 illustrates the blank that is used to form the container shown in FIG. 1. The pour spout 110 includes a flap 110a having a tab portion 110b disposed in an opening or window 110c. The pour spout 110 is opened by grasping the pulling tab 110b and pulling upwardly on the pull tab 110b. The window 110c facilitates convenience of opening the pour spout 110. Leakage from the pour spout is prevented since the pour spout opening is blocked by the flow tube 108. Upon opening of the pour spout 110, the flap 110a becomes partially separated from the container 100. In particular, the flap 110a becomes separated along perforations $P_1$, $P_2$, and $P_3$. A perforated or weakened line $P_4$ then acts as a hinge allowing the pour spout flap 110a to move between an open position and a closed position. When one is interested in closing the flap 110a after dispensing product or material from the container, the somewhat pointed end of the pull tab 110b, which is best seen in FIG. 2, may be inserted into an arcuate slit 110d provided in the side panel 120. Alternatively, instead of continually opening and closing the pour spout flap 110a, the pour spout flap 110a can be completely removed by tearing along the perforation $P_4$ in addition to the $P_1$, $P_2$, and $P_3$.

In the preferred embodiment, the container 100 of the present invention is formed from the one-piece blank of material 100B shown in FIG. 2. This one-piece construction advantageously facilitates manufacture and assembly. A preferred manner of constructing a container 100 from such a blank 100B will now be described with particular reference to FIG. 2. FIG. 2 illustrates the blank from the side that ultimately forms the outside of the container once the folding and securing is completed.

The flow tube 108 and the internal reservoir 104 are defined at least in part by several panels 112, 114, 116, 118, 120, and part of 122. More specifically, the four sides forming the flow tube 108 in the finished package are constituted by the flow-tube panel 116, the portion of the side panel 120 located above the reference line 120' in FIG. 2, the rectangular portion of the L-shaped panel 118 located above the reference line 118' in FIG. 2, and a portion of the rear main panel 122. The sides forming the internal reservoir 104 in the finished package are constituted by the short panel 114, the portion of the L-shaped panel 118 located below the reference line 118' in FIG. 2, the portion of the side panel 120 located below the reference line 120' in FIG. 2, and a portion of the rear main panel 122. The location of the reference lines 118' and 120', i.e., the distinction between the reservoir 104 and the flow tube 108, can be adjusted according to the desired measured amount for the particular material to be dispensed.

To form the flow tube 108 and the reservoir 104, the outer panel 112 is folded relative to the short panel 114 and the flow-tube panel 116 along fold lines $f_1$ and $f_3$, respectively, in such a manner that the outer panel 112 travels in a direction into the page while remaining parallel to the L-shaped panel 118, which simultaneously creates counter folds along fold line $f_2$ and $f_4$. After folding along the fold lines $f_1$, $f_2$, $f_3$, and $f_4$, the two panels 114, 116 are disposed at an angle of approximately 90° relative to the outer panel 112 and to the L-shaped panel 118. The panel 118 is then folded along the fold line $f_5$ (in a direction into the page) until the L-shaped panel 118 is at an angle of roughly 90° relative to side panel 120. At this point, the reservoir 104 and the flow tube 108 structure are almost completed except that one more fold is required to close the structure and allow it to be secured to a portion of the blank. To achieve this, the side panel 120 is folded roughly 90° along the fold line $f_6$ in a direction into the page such that the inside of the outer panel 112 may be attached to the interior surface of a rear main panel 122, which forms the rear face (or front face depending upon the orientation of the container) of the container 100 in the finished package. The outer panel 112 may be secured to the inside of the rear main panel 122 in any suitable fashion. By way of example, an adhesive can be applied along a glue line $g_1$ on the inside surface of the outer panel 112, which is then adhered to the interior surface of the rear main panel 122 in the region $G_1$. At this point, the blank is still in a generally flat condition, except that the reservoir 104 and the flow tube 108 (with open top and bottom ends) have been formed and extend rearwardly (in the orientation of FIG. 2) out of the plane of the blank 100B.

A first top flap 124 is attached to the top edge of the rear main panel 122, and this top flap 124 includes the previously described pour spout perforations or weakened lines $P_3$ and $P_4$. The first top flap 124 also includes an embossed area 126, the outer confines of which are defined by an embossed line $e_1$. The purpose of this embossed area 126 will become apparent from the description below.

A first bottom flap 128 is also attached to the rear main panel 122. The first bottom flap 128 includes embossed areas 130, 132, the outer confines of which are each defined by a respective embossed line $e_2$ and $e_3$.

A first side panel 134 is connected to the rear main panel 122 along a fold line $f_7$. This first side panel 134 forms one of the side panels of the container 100 (FIG. 1) in the finished package.

A first top end flap 136 and a first bottom end flap 138 are attached to the side panel 134. To continue with assembly of the container 100, the rear main panel 122 is moved in a direction into the page along the fold line $f_7$ until the rear main panel 122 is disposed at an angle of 90° relative to the side panel 134.

A front main panel 140 is attached to the side panel 134 along a fold line $f_8$. The front main panel forms the front face (or rear face depending upon the orientation of the container) of the container 100 (FIG. 1) in the finished package. The front main panel 140 may optionally include a transparent window 142 which facilitates viewing the level of the contents in the container 100. The perforated line $P_2$ forming a part of the opening tear line for the pour spout flap 110a as described above is also formed on the front main panel 140. To continue with assembly, the front main panel 140 is folded in a direction into the page along the fold line $f_8$ until the front main panel 140 is at an angle of approximately 90° relative to the side panel 134. At this point in the assembly, the front main panel 140 is parallel to the rear main panel 122, and the inside surface of the front main panel 140 faces the L-shaped panel 118 forming a part of the flow tube 108 and the reservoir 104. In this position, the front main panel 140 can be secured to the panel 118 in any suitable manner, such as through the use of an adhesive. The adhesive can be applied along a second glue line $g_2$ so that the panel 118 is adhered to the inside surface of the front main panel 140.

A second top flap 144 is attached to the top of the front main panel 140. This second top flap 144 also includes embossed areas 146, 148, the outer confines of which are each defined by respective embossed lines $e_4$, $e_5$. A second bottom flap 150 is also attached to the front main panel 140. This second bottom flap 150 includes embossed areas 152, 154, the outer confines of which are each defined by a respective embossed line $e_6$, $e_7$.

A second side panel 156 is attached to the front main panel 140 along fold line $f_9$. The second side panel 156 forms one of the side panels of the container 100 in the finished package. The previously described perforation line $P_1$ forming a part of the opening tear line for the pour spout flap 110a is provided in the second side panel 156. Also formed in the second side panel 156 are the flap 110a, the tab 110b, and the opening 110c. A second top end flap 158 and a second bottom end flap 160 are located at opposite ends of the second side panel 156.

To continue with assembly of the container 100, the second side panel 156 is folded in a direction into the page along the fold line $f_9$ until the second side panel 156 is disposed at an angle of approximately 90° relative to the front main panel 140. At this point, the interior surface of the second side panel 156 faces the side panel 120. The second side panel 156 is then secured to the side panel 120 in any suitable manner, such as through the use of an adhesive. The adhesive can be applied along a glue line $g_3$ so that the inside surface of the second side panel 156 is adhered to the side panel 120.

At this point, the only parts of the container not yet closed and sealed are the top and bottom ends. The closing of the top and bottom ends of the container is accomplished in the following manner.

The first top flap 124 is folded inwardly towards the oppositely located second top flap 144 along the fold line $f_{10}$ until the first top flap 124 is at an angle of approximately 90° relative to the rear main panel 122. The first bottom flap 128 is folded inwardly along the fold line $f_{11}$ towards the oppositely located second bottom flap 150 until the first bottom flap 128 is at an angle of approximately 90° relative to the rear main panel 122.

The first top end flap 136 is folded inwardly along the fold line $f_{14}$ until it comes to rest within the embossed area 126 of the first top flap 124. The first top end flap 136 can optionally be secured to the first top flap 124 by any suitable method, such as by application of an adhesive. The first bottom end flap 138 is folded inwardly along the fold line $f_{15}$ and can optionally be secured to the first bottom flap 128 within the embossed area 130 in the same manner as the first top end flap 136 is secured.

In a similar manner, the second top end flap 158 and the second bottom end flap 160 are folded inwardly along the fold lines $f_{16}$ and $f_{17}$, respectively. The second top end flap 158 can optionally be secured to the first top flap 124 within the area defined by perforated lines $P_3$ and $P_4$, and the second bottom end flap 160 can optionally be secured to the first bottom flap 128 within the embossed area 132.

The second top flap 144 can then be folded inwardly along the fold line $f_{12}$ so that the second top flap 144 is at an angle of approximately 90° relative to the front main panel 140 and overlies top end flaps 136 and 158, and the first top flap 124. The second bottom flap 150 is likewise folded inwardly along the fold line $f_{13}$ until the second bottom flap 150 is at an angle of approximately 90° relative to the front main panel 140 and overlies bottom end flaps 138 and 160, and the first bottom flap 128. The second top flap 144 can then be secured to the first top flap 124 and top end flaps 136 and 158. Similarly, second bottom flap 150 can be secured to first bottom flap 128 as well as bottom end flaps 138 and 160.

This container construction differs from other known container constructions in which the end flaps are folded inwardly before the first and second top or bottom flaps are folded inwardly. For example, folding the first and second top end flaps 136, 158, respectively, in between the first and second top flaps 124, 144, respectively, is advantageous because it provides a container end construction that is less susceptible to infestation by bugs or the like. The same is true for folding the first and second bottom end flaps 138, 160, respectively, in between the first and second bottom flaps 128, 150, respectively.

Figure 2B:
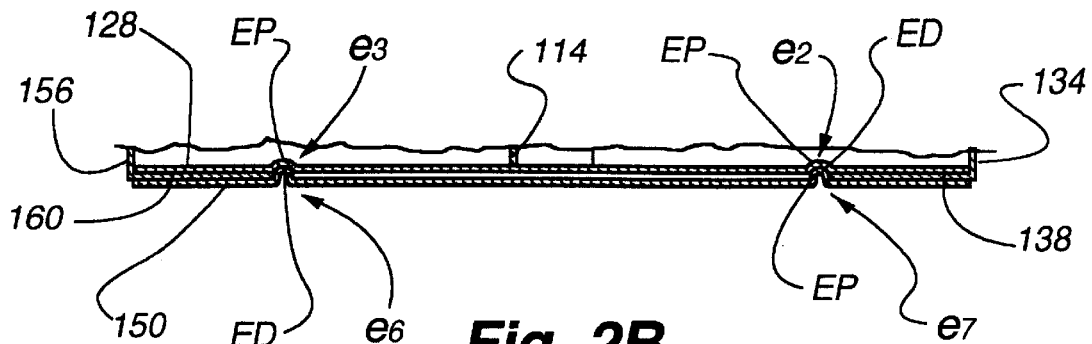
FIG. 2B is a fragmentary sectional view taken along line 2B—2B of FIG. 1.

Referring to FIG. 2B, which is a fragmentary sectional view taken along line 2B—2B of FIG. 1, embossed lines $e_n$ (e.g., $e_2$, $e_3$, $e_6$, and $e_7$ in FIG. 2B) are defined by an embossed depression ED on one surface of a flap and a corresponding embossed projection EP on the opposite surface of the flap. For example, when the second bottom flap 150 is folded over the first and second bottom end flaps 138, 160, respectively, and comes into contact with the first bottom flap 128, the projections EP on the top surface of the second bottom flap 150 formed by embossment lines $e_6$ and $e_7$ align with embossed depressions ED on the bottom surfaces of the first bottom flap 128 formed by corresponding embossment lines $e_3$ and $e_2$, respectively. By using this folding sequence while aligning the embossment projections EP and depressions ED, close contact between the first and second bottom flaps 128, 150, respectively (or the first and second top flaps 124, 144, respectively), and the first and second bottom end flaps 138, 160, respectively (or the first and second top end flaps 136, 158, respectively), can be attained, thereby minimizing or eliminating undesirable gaps and forming a better seal.

As previously noted, the particular size and shape of the container 100 is not limited to the illustrated embodiments. However, to complete the description of the illustrated embodiment, dimensions $D_1$–$D_5$ can have the following approximate values:

| Dimension | Value (inches) |
| --- | --- |
| $D_1$ | 9.0 |
| $D_2$ | 6.4 |
| $D_3$ | 1.5 |
| $D_4$ | 22.6 |
| $D_5$ | 12.0 |

Figure 3:
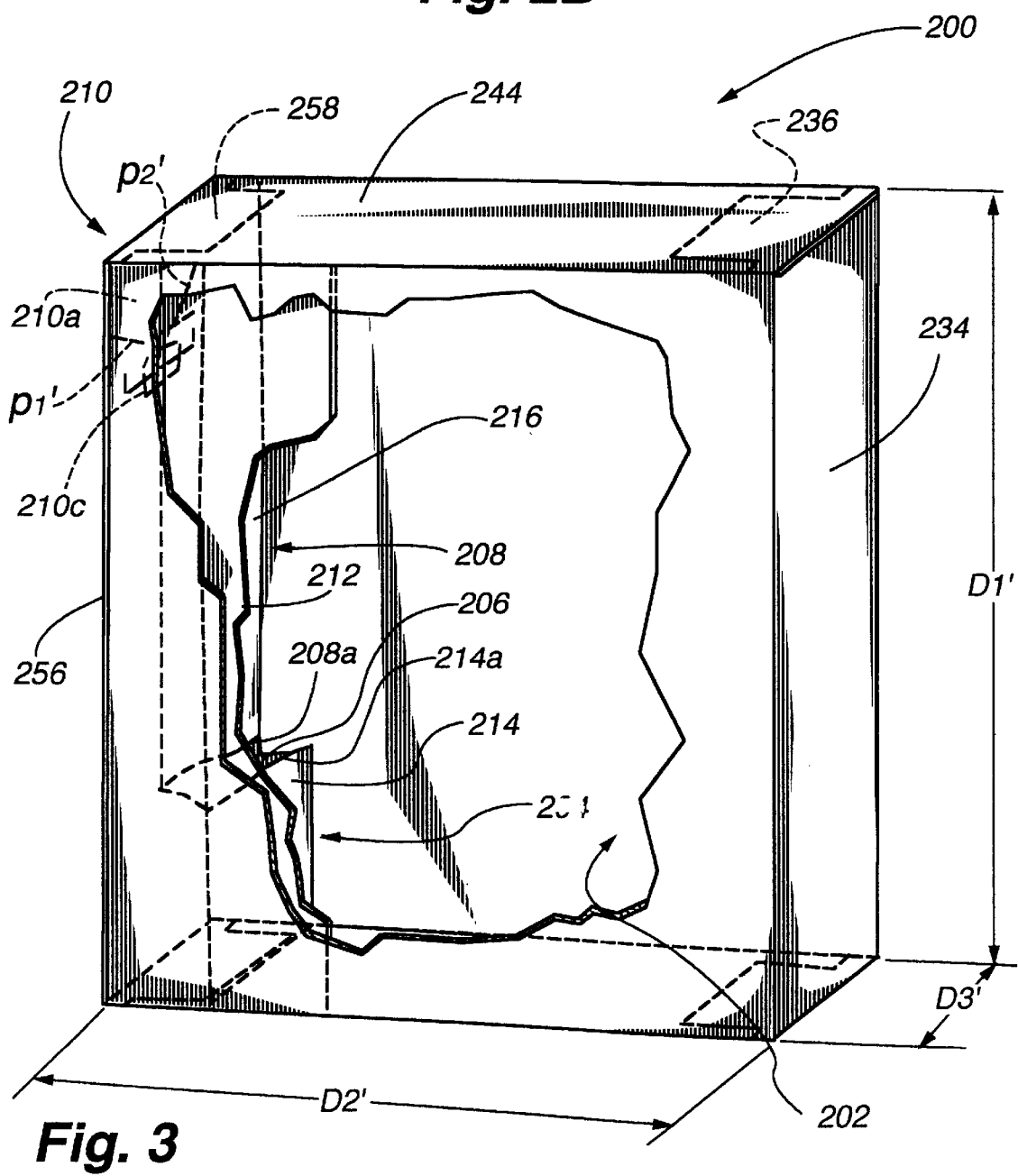
FIG. 3 is a cut-away isometric view of a container according to a second embodiment of the present invention.
Figure 4:
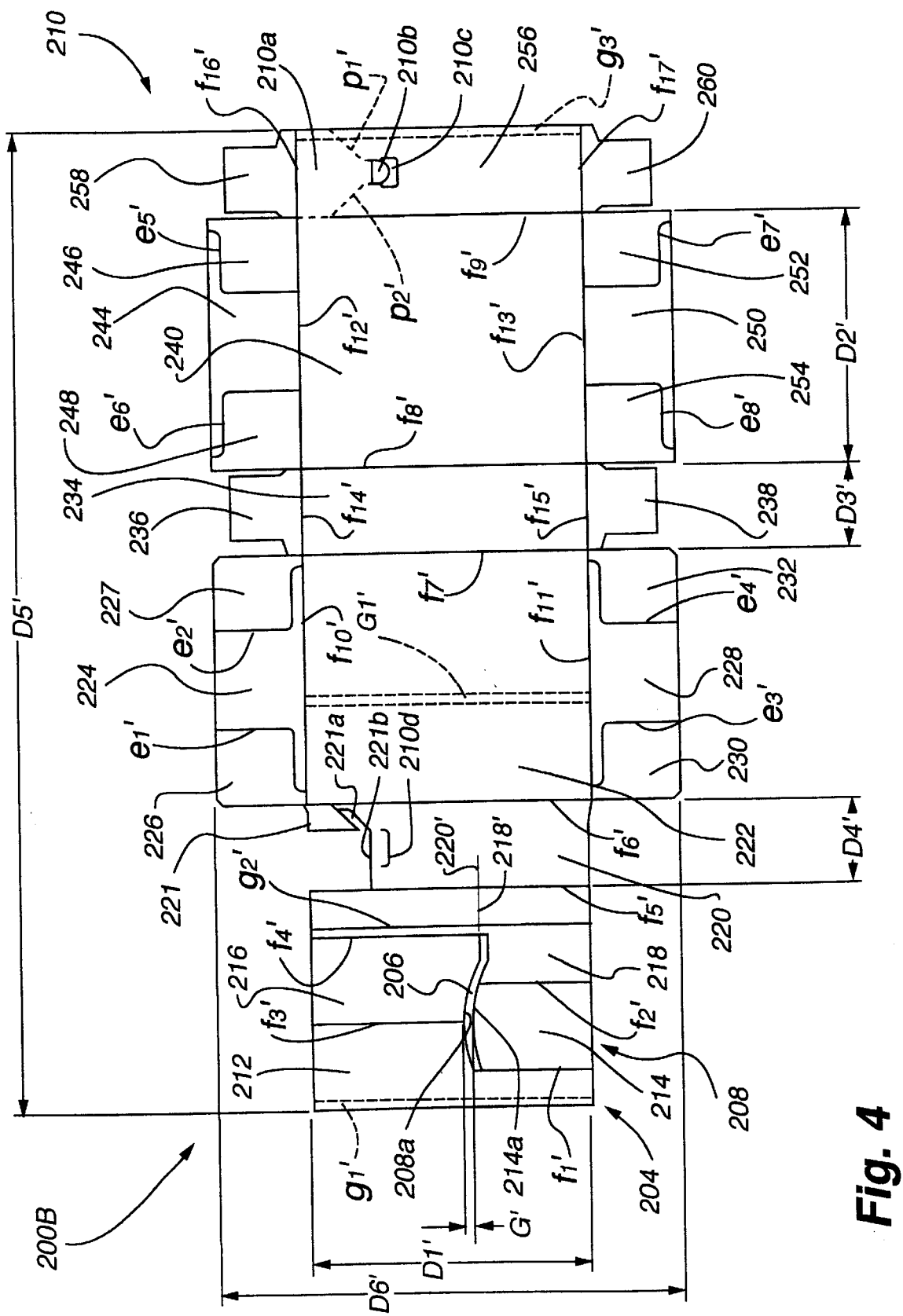
FIG. 4 is a plan view of a blank used to form the container of FIG. 3.

A second embodiment of a container 200 constructed according to the principles of the present invention is illustrated in FIGS. 3–4. The container 200 is similar in construction to the container 100 shown in FIG. 1 and described above, except that the reservoir/flow tube and the pour spout are constructed in a somewhat different manner. The container 200 functions in a manner similar to the container 100 described above, and possesses similar advantages. The features of the container and blank shown in FIGS. 3 and 4 that correspond to features associated with the container and blank illustrated in FIGS. 1 and 2 are identified with the same reference numerals except that "200" series numbers are used to depict features in the container shown in FIGS. 3 and 4 whereas the same features are designated in the container shown in FIGS. 1 and 2 with "100" series numbers.

The container 200 shown in FIG. 3 includes a reservoir 204 that is located at the bottom of the interior compartment 202 within the container. The upper end of the reservoir 204 is provided with an opening 206 for receiving the material being dispensed. One face of the reservoir 204 is defined by a short panel 214, and this panel 214 has an arched surface 214a that defines an upwardly projecting lip of the reservoir opening 206, although other geometric shapes are possible. This lip 214a helps control the flow of product into reservoir 204 and helps retain product within the reservoir 204. As noted above in connection with the first embodiment, an important aspect in the proper design of the reservoir 204 and the flow tube 208 is the vertical spacing or gap G' (FIG. 4) provided between the lip 214a of the reservoir opening 206 and a bottom lip 208a of the flow-tube panel 216. The size of this gap G', and the relative shapes of the lips 214a and 208a can be varied depending upon the size, shape, and other properties of the material being dispensed, and depending upon other factors such as the width of the reservoir opening 206. Although the lips illustrated in connection with this embodiment are arcuately shaped and disposed in a spaced, parallel relationship, other shapes and configurations are possible. For instance, the lips 214a and 208a may converge and/or diverge.

As shown in FIG. 3, the reservoir 204 and the opening 206 are shorter in the lateral direction, and taller in the longitudinal direction, as compared to the reservoir 104 and opening 106 in the embodiment shown in FIG. 1. The flow tube 208 communicates with reservoir 204 in the same manner as in the above-described embodiment.

As with the first embodiment, the container 200 (FIG. 3) is preferably formed from a one-piece blank 200B (FIG. 4). FIG. 4 illustrates the blank from the side which forms the outside of the container 200 in the finished package.

The internal reservoir 204 and the flow tube 208 are formed from panels 212, 214, 216, 218, 220, and part of the rear main panel 222. More specifically, the outer confines or walls of the internal reservoir 204 are defined by the short panel 214, the portion of the L-shaped panel 218 lying below the reference line 218' in FIG. 4, the portion of the side panel 220 lying below the reference line 220' in FIG. 4, and a portion of the rear main panel 222. The outer confines or walls of the flow tube 208 are defined by the flow-tube panel 216, the portion of the L-shaped panel 218 lying above the reference line 218' in FIG. 4, the portion of the side panel 220 lying above the reference line 220' in FIG. 4, and a portion of the rear main panel 222.

To assemble the container 200 of FIG. 3, the outer panel 212 is folded approximately 90° relative to the panels 214 and 216 along the fold lines $f_1'$ and $f_3'$, respectively, in a direction into the plane of the page while keeping outer panel 212 parallel to L-shaped panel 218, which simultaneously creates counter folds along fold lines $f_2'$ and $f_4'$. After thus folding along fold lines $f_1'$, $f_2'$, $f_3'$, and $f_4'$, the two panels 214, 216 are then disposed at an angle of approximately 90° relative to the outer panel 212 and to the L-shaped panel 218. The panel 218 is then folded into the plane of the page along the fold line $f_5'$ until the panel 218 is at an angle of roughly 90° relative to the side panel 220. The side panel 220 is then folded into the plane of the page along the fold line $f_6'$ until the side panel 220 is at an angle of roughly 90° relative to the rear main panel 222. This then generally defines the outer confines of the flow tube 208 and the reservoir 204, it only being necessary to secure the outer panel 212 to the inside surface of the rear main panel 222. This can be achieved by, for example, adhesively securing the interior surface of the outer panel 212 to the interior surface of the rear main panel 222. The adhesive can be applied to the outer panel 212 along a glue line $g_1'$ on the interior surface of the outer panel 212 and adhered to the area $G_1'$ on the interior surface of the rear main panel 222 (FIG. 4).

The folding and construction of the container 200 shown in FIG. 3 from the blank 200B shown in FIG. 4 continues in a manner similar to that described above in connection with the first embodiment. Adhesive is applied along a glue line $g_2'$ (FIG. 4) on the outside surface of the L-shaped panel 218 and is adhered to the inside surface of the front main panel 240 adjacent to fold line $f_9'$.

The pour spout 210 of the second embodiment is constructed to facilitate the flow of material out of the flow tube 208. The features of the pour spout 210 can be seen with reference to FIGS. 3, 4, 4A, and 4B.

Figures 4A, 4B:
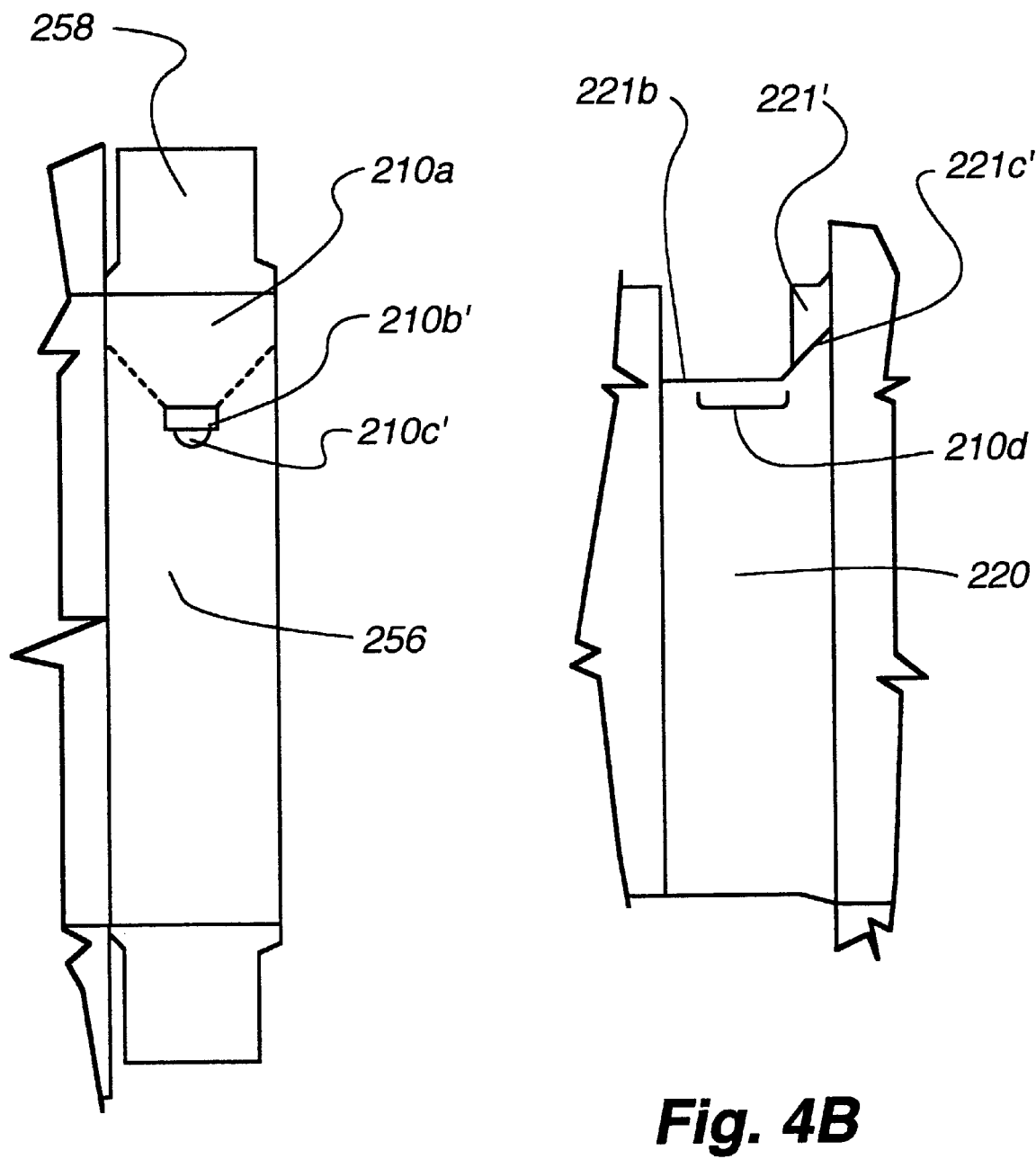
FIG. 4A is a fragmentary plan view of a modified pour spout construction.
FIG. 4B is a fragmentary plan view of a modified side panel construction.

The pour spout 210 includes a flap 210a having a tab portion 210b disposed adjacent an opening or window 210c serving as a finger-receiving area. In the embodiment illustrated in FIGS. 3 and 4, the tab 210b is arcuate and the window 210 is squared. Of course, the tab/window construction is subject to modification. For example, as illustrated in FIG. 4A, the tab 210b' is squared and the window 210c' is arcuate. To close the flap 210a, the tab 210b or 210b' may be inserted into a slit 210d provided in the side panel 220.

The pour spout 210 is opened by grasping and pulling upwardly on the tab portion 210b. The flap 210a may then be partially separated from the container 100 along the perforated lines $P_1'$ and $P_2'$. In contrast to the first embodiment, which included perforation lines $P_3$ and $P_4$ on the first top flap 124, the flap 210a shown in FIGS. 3 and 4 is hinged at a fold line $f_{16}'$. The pour spout opening is defined by the space between the border 221b of the side panel 220 and the fold line $f_{16}'$.

The first top flap 224 of the second embodiment includes an embossed area 227, the outer confines of which are shown by the embossed line $e_2'$, in lieu of the perforated lines $P_3$ and $P_4$ shown in FIGS. 1 and 2. The second top panel 244 includes embossed areas 246, 248, the outer confines of which are each defined by respective embossed lines $e_5'$, $e_6'$ (FIG. 4).

To complete the construction of the container 200 shown in FIG. 3, adhesive is applied along a glue line $g_3$ on the interior surface of the side panel 256, and this portion of the side panel 256 is then adhered to the outer surface of the side panel 220. The distance between the border 221b and the fold line $f_{16}'$ represents a relatively large segment that cannot be adhered to the side panel 256, and this might tend to weaken the connection near the upper ends of the side panels 220 and 256. Thus, a removable glue flap 221 is provided. This glue flap 221 is connected at least along the fold line $f_6'$ to the rear main panel 222. Preferably, at least a portion of the glue flap 221 is also attached to the side panel 220. The glue flap 221 is adhered to the interior surface of the pour spout flap 210a along the glue line $g_3'$, thereby improving the connection between the side panels 220 and 256 in the area between the border 221b and the fold line $f_{16}'$. The glue flap 221 is preferably separable from the panels 220, 222 along with the pour spout flap 210a when the pour spout is opened. An undercut 221a may optionally be provided to facilitate separation and removal of the glue flap 221.

The glue flap construction described above can, of course, be modified. For example, as illustrated in FIG. 4B, the glue flap 221 ' may be disposed directly upon the border 221b, without any undercut separation. A perforated or cut line 221c' is preferably provided to facilitate separation of the glue flap 221'.

As noted previously, the particular size and shape of the container 200 should not be considered as limited to the illustrated embodiment. However, to complete the description of the illustrated embodiment, dimension $D_1'$–$D_5'$ (FIG. 4) may have the following approximate values:

| Dimension | Value (inches) |
| --- | --- |
| $D_1'$ | 6.25–9.00 |
| $D_2'$ | 5.50–6.50 |
| $D_3'$ | 2.00–2.50 |
| $D_4'$ | 1.90–2.40 |
| $D_5'$ | 21.75–25.65 |
| $D_6'$ | 10.20–14.00 |

Figure 5:
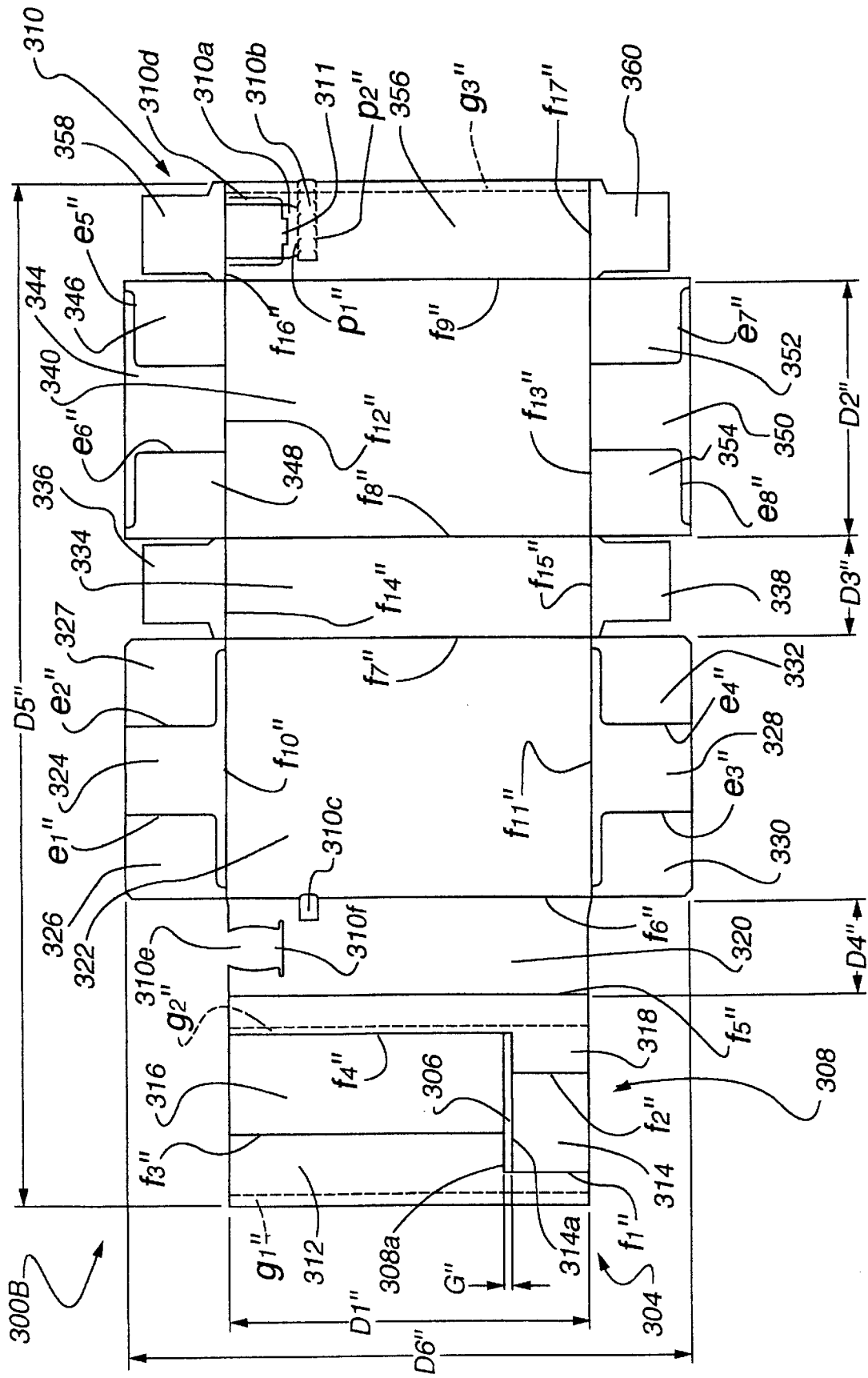
FIG. 5 is a plan view of a third embodiment of a blank used to construct a container according to the principles of the present invention.

A third embodiment of the present invention is illustrated in FIG. 5. A container constructed from blank 300B is similar in construction to the first and second embodiments. The primary differences reside in the pour spout construction 310 and certain aspects of the reservoir 304 and flow tube 308. Those features of the blank shown in FIG. 5 that correspond to the features of the first and/or second embodiments are identified with corresponding reference numerals, except that the features of the blank shown in FIG. 5 are designated by a "300" series number having the same last two digits as the corresponding features designated with a "100" or "200" series number.

The top of the reservoir 304 is provided with an opening 306 for receiving the material to be dispensed. One face of the reservoir 304 is defined by a short panel 314. Unlike the second embodiment in which the short panel 214 has an arched surface 214a, the short panel 314 shown in FIG. 5 has a straight border surface 314a. Overall, the reservoir 304 is shorter in the longitudinal direction, and wider in the lateral direction, when compared with the reservoir 204 of the second embodiment. The blank 300B shown in FIG. 5 is folded in the same manner described in connection with the first and second embodiments to form the reservoir 304 and the flow tube 308. The construction of a container from the blank 300B shown in FIG. 5 is also completed in the same manner described above in connection with the first and second embodiments.

The pour spout 310 associated with the container blank depicted in FIG. 5 is constructed in a manner that differs from the pour spout construction of the other embodiments described above. In a first form, the pour spout 310 includes a flap 310a which is attached to a removable connection tab 310b. To release the flap 310a and open the pour spout, the tab 310b is grasped and pulled sideways to separate the flap 310a from the container along the perforated lines $P_1$" and $P_2$". A window or opening 310c is provided to facilitate the grasping of the tab 310b. The tab 310a is hinged along the fold line $f_{16}$" and is swung open to expose the pour spout opening 310e, through which material exits the flow tube 308. The flap 310a may be inserted into the elongated slot 310f formed at the bottom of the opening 310e to close the pour spout 310. When thus inserted, the flap 310a covers the pour spout opening 310e and overlaps the panel 320 without swinging through the opening 310e. In a second form, the pour spout 310 includes a alternative flap 310d, which is also shown in FIG. 5. The alternative flap 310d is shorter vertically and wider horizontally than the flap 310a. Further, the flap 310d is not released by the connection tab 310b, which is not required for this alternative flap 310d. If the connection tab 310b is not used, the window or opening 310c may be omitted. The alternative tab 310d is hinged along the fold line $f_{16}$" and is swung open to expose the pour spout opening 310e. The flap 310d may be held closed by inserting a tab or extended portion 311 into the elongated slot 310f. The flaps 310a and 310d are alternatives and would not occur together on the panel 356.

As noted above, the particular size and shape of the container should not be considered as limited to the illustrated embodiment. However to complete the description of the illustrated embodiment, dimensions $D_1$"–$D_6$" may have the following approximate values:

| Dimension | Value (inches) |
| --- | --- |
| $D_1$" | 9.00 |
| $D_2$" | 6.50 |
| $D_3$" | 2.50 |
| $D_4$" | 2.40 |
| $D_5$" | 25.60 |
| $D_6$" | 14.00 |

By providing a container with the above-described features, a predetermined, controlled amount of product or contents in the container can be dispensed. When the container is upright, product in the container flows into the reservoir in an amount equal to the volume of the reservoir. When the container is then turned over to dispense the product, only that product which is in the reservoir can flow into the flow tube and be dispensed out of the pour spout. Additional product in the container cannot flow into the reservoir during the dispensing step because of the configuration of the reservoir. It is thus possible to control or meter the amount of product dispensed from the container by controlling the volume of the reservoir.

A reservoir/flow tube constructed according to the principles of the present invention is relatively simple and inexpensive to form. This construction can also function to temporarily house secondary or promotional items separate from the main contents of the container.

The principles, preferred embodiments, and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes, and equivalents that fall within the spirit and scope of the invention be embraced thereby.

We claim:
1. A three-dimensional container formed from a two-dimensional blank and having an interior for pourably retaining a granular material, said container comprising
   a plurality of panels enclosing a volume defining the interior of the container;
   a pour spout providing a passage through at least one of said panels;

a reservoir mounted within the interior of the container and adapted to hold a predetermined amount of the granular material, said reservoir having an open top portion adapted to receive the granular material, said open top portion defined by a first lip and a second lip, said first lip being both vertically and horizontally spaced from said second lip; and a flow tube connecting said reservoir with said pour spout, wherein said reservoir and said flow tube form are integrally formed as part of the two-dimensional blank.

2. The three-dimensional container of claim 1, wherein said reservoir, said flow tube, and said pour spout are all integrally formed as part of the two-dimensional blank.

3. The three-dimensional container of claim 1, wherein the interior of the container has a bottom portion and a top portion, and further wherein said reservoir is mounted at the bottom portion, and said pour spout is provided at the top portion of the interior of the container.

4. The three-dimensional container of claim 3, wherein said pour spout further comprises a flap having a tab portion.

5. The three-dimensional container of claim 4, wherein a second opening is provided in said at least one of said panels through which said pour spout provides said passage, and wherein said second opening is adjacent to said pour spout, and wherein said tab portion of said flap is disposed in said second opening.

6. The three-dimensional container of claim 4, wherein said flap is attached to a removable connection tab formed between first and second perforated lines in said at least one of said panels.

7. The three-dimensional container of claim 3, wherein said first lip is spaced a first distance from said bottom portion and said second lip is spaced a second distance from said bottom portion, said first distance being less than said second distance.

8. The three-dimensional container of claim 1, wherein said container is in the form of a three-dimensional, folded box having a height, a width, and a depth.

9. The three-dimensional container of claim 1, wherein the two-dimensional blank is constructed from cardboard.

10. The three-dimensional container of claim 9, wherein said cardboard is on the order of 0.01–0.03 inches thick.

11. The three-dimensional container of claim 1, wherein reservoir comprises a plurality of panel sides and said second lip forms the bottom edge of one of said plurality of panel sides.

12. The three-dimensional container of claim 1, wherein at least one of said first and second lips are arcuately shaped.

13. A blank constructed from a foldable material and adapted to be formed into a three-dimensional container for pourably retaining a granular material, said blank comprising a first plurality of panels comprising three side panels and two main panels joined by a first plurality of fold lines, said first plurality of fold lines being vertically disposed, each of said three side panels being (i) narrower than each of said two main panels and (ii) contiguous with at least one of said two main panel, and each of said two main panels being contiguous with at least two of said three side panels;

at least one top flap contiguous with at least one of said main panels;

at least two top end flaps contiguous with at least one of said side panels;

at least one bottom flap contiguous with at least one of said main panels;

at least two bottom end flaps contiguous with at least one of said side panels; and a second plurality of panels comprising reservoir-and-flow-tube-forming panels joined by a second plurality of fold lines, wherein at least one of said second plurality of panels is contiguous with at least one of said first plurality of panels along a joining fold line.

14. The blank of claim 13, wherein at least one of said two main panels has a transparent window formed therein.

15. The blank of claim 13, wherein a first one of said three side panels is contiguous with only a first one of said main panels, wherein a second one of said three side panels is contiguous with both said first one of said main panels and a second one of said main panels, and wherein a third one of said three side panels is contiguous with said second one of said main panels.

16. The blank of claim 15, wherein said second plurality of panels comprises an L-shaped panel, a flow-tube panel, a short panel, and an outer panel.

17. The blank of claim 16, wherein said joining fold line is between said third one of said three side panels and said L-shaped panel.

18. The blank of claim 17, wherein a pour spout is formed at least partially in said first one of said three side panels.

19. The blank of claim 18, wherein said pour spout comprises a flap defined only in said first one of said three side panels by first and second perforations.

20. The blank of claim 19, wherein said pour spout further comprises a tab, and wherein a slit adapted to accommodate said tab is formed in said third one of said three side panels.

21. The blank of claim 13, wherein said first and third ones of said three side panels are configured to overlap when said blank is formed into the three-dimensional container.

22. A method of forming a two-dimensional blank into a three-dimensional container having an interior adapted to pourably retain a predetermined amount of granular material, a top end, and a bottom end, wherein said blank is constructed from a foldable material and comprises a first plurality of panels joined by a first plurality of fold lines, said first plurality of panels comprising first and second main panels, and first, second, and third side panels, wherein said side panels are narrower than said main panels, and wherein said first side panel is contiguous with only said first main panel, wherein said second side panel is contiguous with both said first and second main panels, and wherein said third side panel is contiguous with said second main panel;

at least one top flap contiguous with at least one of said main panels;

at least two top end flaps contiguous with at least one of said side panels;

at least one bottom flap contiguous with at least one of said main panels;

at least two bottom end flaps contiguous with at least one of said side panels; and a second plurality of panels joined by a second plurality of fold lines, said second plurality of panels comprising an L-shaped panel, a flow-tube panel, a short panel, and an outer panel, wherein said second plurality of panels is contiguous with said first plurality of panels along a fifth fold line between said third side panel and said L-shaped panel, wherein said second plurality of fold lines comprises a first fold line joining said outer panel with said short panel;

a second fold line joining said short panel with said L-shaped panel;

a third fold line joining said outer panel with said flow-tube panel; and a fourth fold line joining said flow-tube panel with said L-shaped panel;

wherein said first plurality of fold lines comprises a sixth fold line joining said third side panel with said second main panel;

a seventh fold line joining said second main panel with said second side panel;

an eighth fold line joining said second side panel with said first main panel; and a ninth fold line joining said first main panel with said first side panel;

said method comprising the steps of folding substantially 90° in a first direction along said first and third fold lines while simultaneously folding in a second, opposite direction along said second and fourth fold lines to position said short panel and said flow-tube panel perpendicularly between said outer panel and said L-shaped panel while keeping said outer panel substantially parallel to said L-shaped panel;

folding substantially 90° in said second direction along said fifth fold line;

folding substantially 90° in said second direction along said sixth fold line to bring said outer panel into contact with said second main panel;

attaching said outer panel to said second main panel;

folding substantially 90° in said second direction along said seventh fold line;

folding substantially 90° in said second direction along said eighth fold line to bring said L-shaped panel into contact with said first main panel;

attaching said L-shaped panel to said first main panel;

folding substantially 90° along said ninth fold line to bring said first side panel contact with said third side panel;

attaching said first side panel to said third side panel;

closing said top end; and closing said bottom end.

23. The method of claim 22, wherein said top end comprises a first top flap joined by a tenth fold line to said second main panel;

a second top flap joined by a twelfth fold line to said first main panel;

a first top end flap joined by a fourteenth fold line to said second side panel; and a second top end flap joined by a sixteenth fold line to said first side panel;

said step of closing said top end further comprising the steps of folding said first top flap substantially 90° along said tenth fold line toward said first main panel;

folding said first top end flap substantially 90° along said fourteenth fold line toward said second top end flap and onto said first top flap;

folding said second top end flap substantially 90° along said sixteenth fold line toward said first top end flap and onto said first top flap; and folding said second top flap substantially 90° along said twelfth fold line onto said first top flap and said first and second top end flaps.

24. The method of claim 23, further comprising the steps of attaching said first top end flap to said first top flap;

attaching said second top end flap to said first top flap; and attaching said second top flap to said first top flap and to said first and second top end flaps.

25. A three-dimensional container formed from a two-dimensional blank and having an interior for pourably retaining a granular material, said container comprising:

a plurality of panels enclosing a volume defining an interior of the container said interior comprising a bottom side;

a pour spout providing a passage though at least one of said panels, and a dispensing unit mounted within the interior of the container, said dispensing unit comprised of a plurality of dispensing unit panels and having a reservoir portion and a flow tube portion, said reservoir portion adapted to receive a predetermined amount of granular material through an open top portion, said open top portion at least partially defined by a first lip and a second lip, said first lip being arcuately shaped and horizontally spaced from said second lip, said flow tube portion connecting said reservoir portion with said pour spout and having a front panel of the plurality of dispensing unit panels wherein a bottom edge of said front panel forms said second lip.

26. The three-dimensional container of claim 25, wherein said first and second lips are further vertically spaced from each other.

27. The three-dimensional container of claim 25, wherein said second lip is arcuately shaped.

28. The three-dimensional container of claim 25, wherein the arcuate shape of said first lip is convex.

29. The three-dimensional container of claim 25, wherein a distance between a topmost portion of the first lip and said bottom side is less than a distance between a topmost portion of said second lip and said bottom side.

30. A blank constructed from a foldable material and adapted to be formed into a three-dimensional container for pourably retaining a granular material, the blank comprising:

a first plurality of panels comprising at least first and second side panels and first and second main panels joined by a first plurality of fold lines, said first plurality of fold lines being substantially vertically disposed, each of said first and second side panels being narrower than each of said first and second main panels, said first side panel being contiguous with said first and second main panels, and said second side panel being contiguous with at least one main panel;

a first main top end flap contiguous with said first main panel;

a second main top end flap contiguous with said second main panel;

a first side top end flap contiguous with said first side panel;

a first main bottom end flap contiguous with said first main panel, the first main bottom end flap having a first set of at least one embossed lines disposed thereon;

a second main bottom end flap contiguous with said second main panel, the second main bottom end flap having a second set of at least one embossed line disposed thereon, wherein a topside of one set of embossed lines of the first and second set of embossed lines is mateably received into a bottom side of the other set of embossed lines when said blank is form into said three-dimensional container;

a first side bottom end flap contiguous with said first side panel;

a second side bottom end flap contiguous with said second side panel; and a second plurality of panels comprising reservoir-and-flow-tube-forming panels joined by a second plurality of fold lines, wherein at least one of said second plurality of panels is contiguous with at least one of said first plurality of panels along a joining fold line.

31. The three-dimensional container formed from the blank of claim 30.

32. The three-dimensional container of claim 31, wherein said first and second side bottom end flaps are confined between said first and second main bottom end flaps.

33. The three-dimensional container of claim 32, wherein at least one edge of each of said first side bottom end flaps is adjacent at least one embossed line of said first set of embossed lines.

34. The three-dimensional container of claim 32, wherein at least a substantial portion of at least two edges of said first side bottom end flap is adjacent two or more embossed lines of said first set of embossed lines.

35. The blank of claim 30, wherein said first and second sets of embossed lines define one or more embossed areas at left and right sides of both said first and second main bottom end flaps, wherein said first and second side bottom end flaps are received between corresponding embossed areas on said first and second main bottom end flaps when the blank is assembled into the three-dimensional container.

36. A tree-dimensional container formed from the blank of claim 35.

37. The blank of claim 30, wherein said second plurality of panels comprises an L-shaped panel, a flow-tube panel, a short panel, and an outer panel.

38. The blank of claim 37, wherein said joining fold line is between said second side panel and said L-shaped panel.

39. The blank of claim 37, wherein a top edge of said short panel and a bottom edge of said flow tube panel define a vertical gap therebetween.

40. The blank of claim 37, wherein a top edge of the short panel is arcuately shaped.

41. The blank of claim 30, wherein the first plurality of panels further comprises a third side panel, said third side panel being contiguous with at least one of said main panels.

42. The blank of claim 41, wherein said joining line is between said third side panel and said second plurality of panels.

* * * * *